Patented Sept. 26, 1950

2,523,955

UNITED STATES PATENT OFFICE 2,523,955

RECOVERY OF CYSTINE FROM HAIR

Havard L. Keil, Clarendon Hills, Ill., assignor to Armour and Company, Chicago, Ill., a corporation of Illinois No Drawing. Application December 31, 1948,
Serial No. 68,747

2 Claims. (Cl. 260—529)

In recovery of cystine from keratins such as hair or hoofs, the standard methods have involved the use of hydrochloric or sulphuric acid hydrolyses over a period of 18 to 24 hours. The recovered cystine contained large quantities of impurities such as tyrosine and required a subsequent purification which in turn was wasteful of the product. The long periods of hydrolyses not only destroyed cystine but also liberated numerous other amino acids which acted as contaminants in the final product. There has long been a need for a process providing for the recovery of cystine in a relatively pure form and to the exclusion of the contaminants and in a relatively short period of time.

An object of the present invention is to provide a process in which pure cystine may be obtained from hair in a relatively short period of time with maximum yields. Yet another object is to provide a process in which there is an accurate control of time, temperature and amount of acid employed for the liberation of cystine by precipitation, no subsequent purification steps being made necessary. Other specific objects and advantages will appear as the specification proceeds.

In one embodiment of the invention, the hair, such as cattle hair, hog hair, sheep hair (wool) and other animal hair, is hydrolized with sulphuric acid. We prefer to employ from 1.25 grams to 1.75 grams of sulphuric acid (95–96% sulphuric acid) per gram of hair. Water is added to the mixture of hair and sulphuric acid to give an initial boiling point of about 120° C. The temperature is raised slowly to about 130° C. in a period of time of 1.5 hours to 4 hours. Best results are obtained in a digestion period of about 2 hours.

After complete hydrolysis of the protein the crude cystine may then be separated from the other components. While a pH of from 3.0 to 9.5 may be employed, we prefer to employ an alkaline pH of from 7–9.5. We find that a pH of about 9 throws down the largest amount of crude cystine. The liquid may be separated from the solids by filtration and the cystine-containing filter cake may then be washed in water to dissolve out as much soluble material as possible.

For the purification of the crude cystine any suitable method may be employed. In one procedure, purification of the crude cystine is effected by suspending the material in water acidified with sulphuric acid to pH 2–4, and preferably about pH 3.0, and filtering. This dissolves out other amino acids but does not remove cystine so that it remains in the precipitate. The precipitate may again be suspended in water and acidified with sulphuric acid to pH 1–2 (preferably 1.2), heated to boiling and filtered. The precipitate is discarded and the filtrate is preferably bleached by boiling with charcoal and filtering. Ammonia is then added to the filtrate to bring the pH to 5.0 which precipitates the purified cystine. It is interesting to note that the crude cystine comes down most completely on the alkaline side (pH 7–9.5) while the purified material separates most completely on the acid side near the isoelectric point of pH 5.0.

We have discovered that temperatures in excess of 135° C. have a destructive effect on the yield of pure cystine. Further, inadequate amounts of sulphuric acid and inadequate time result in low yields. For example, when the proportion of sulphuric acid is less than 1 to 1 or when the digestion period is less than 1.5 hours, lower yields are obtained. Further, when the digestion period is continued beyond 4 hours a lower yield results.

The following examples may be set out as illustrative of the process:

Example I

To 500 grams of hog hair was added a mixture of 625 grams of sulphuric acid (95–96% sulphuric acid) and 437.5 grams of water. Boiling was continued for 2 hours when the boiling point increased from an initial of 120° C. to 130° C. within the allotted time.

After the above hydrolysis had been performed, about 500 cc. of cold water was stirred into the batch. Dry ammonia gas was run in to bring the pH to 9.0 and the cystine-containing precipitate was removed by filtration. The precipitate was broken up into 500 cc. of cold water and stirred until thoroughly suspended after which it was again separated by filtration. This served to remove much of the ammonium sulphate and adhering mother liquor. To this precipitate was added about 1000 cc. of cold water and the mixture well stirred to suspend all solids. Sulphuric acid was added to bring the pH to 3.0. The mixture was then filtered and the precipitate taken up in 500 grams of water with agitation. Sulphuric acid was added to bring the pH to 1.0 and the mixture heated to boiling and again filtered. The precipitate was discarded and the filtrate containing the cystine was treated for the recovery of the cystine. To the filtrate was added 50 grams of powdered charcoal and 10 grams of filter earth and the mixture boiled and filtered hot to give a colorless liquid. The liquid was cooled and dry ammonia run in to bring the pH to 5.0. Cystine precipitated immediately and was washed, again filtered and air-dried. The cystine yield was 4.5%.

*Example II*

To 500 grams of cattle hair was added a mixture of 750 grams of sulphuric acid (95–96%) and 525 grams of water. Boiling was continued for 2 hours when the boiling point increased from an initial of 120° C. to 130° C. within the allotted time. The separation procedure described in Example II was then followed and the cystine yield was 4.5%.

*Example III*

To 500 grams of sheep hair (wool) was added a mixture of 875 grams of sulphuric acid (95–96%) and 612.5 grams of water. Boiling was continued for 2 hours when the boiling point increased from an initial of 120° C. to 130° C. within the allotted time. The further separations as described in Example II, were then employed to obtain a cystine yield of 4.5%.

In another example while following a procedure similar to Example IV but where the temperature was raised to 138° C., the cystine yield was only 2.44%.

In similar examples where the digestion period was less than 1.5 hours, the cystine yield was about 3.0% and in another example about 3.3%. Similarly, when the digestion period exceeded 4 hours, it was found in one example that the cystine yield was 2% and in another example 1.5%.

While in the foregoing specification, we have set forth specific steps in considerable detail for the purpose of illustrating an embodiment of the invention, it will be understood that such details may be varied widely by those skilled in the art without departing from the spirit of our invention.

We claim:

1. In a process for the recovery of cystine from hair, the steps of adding sulphuric acid and water to hair to bring the temperature to about 120° C., heating the material slowly to bring the temperature to about 130° C. in a period of about 1.5 to 4 hours, cooling the mixture to halt the hydrolysis, adjusting the pH to about 7–9.5 to precipitate crude cystine, adjusting the pH of the precipitate to about 2–4, removing the filtrate, adjusting the pH of the precipitate again to 1–2, and then adjusting the pH of the filtrate to about 5.0 to precipitate cystine.

2. In a process for the recovery of cystine from hair, the steps of adding sulphuric acid and water to hair to bring the temperature to about 120° C., heating the material slowly to bring the temperature to about 130° C. in a period of about 2 hours, cooling the mixture to halt the hydrolysis, adjusting the pH to about 7–9.5 to precipitate crude cystine, adjusting the pH of the precipitate to about 2–4, removing the filtrate, adjusting the pH of the precipitate again to 1–2, and then adjusting the pH of the filtrate to about 5.0 to precipitate cystine.

HAVARD L. KEIL.

REFERENCES CITED

The following references are of record in the file of this patent:

Salkowski, Biochem. Zeit., vol. 133, pages 1–20 (1922).

Hunter et al.: J. Biol. Chem., vol. 72, pages 153–154 (1927).

Thompsett: Biochem. J., vol. 25, page 2014 (1931).

Andrews: J. Biol. Chem., vol. 97, pages 657–662 (1932).

Toennies et al.: J. Biol. Chem., vol. 112, pages 39–49 (1935).